Jan. 17, 1933.   A. LA R. PARKER   1,894,700
COUPLING AND WASHER ASSEMBLY
Filed March 17, 1931   2 Sheets-Sheet 2
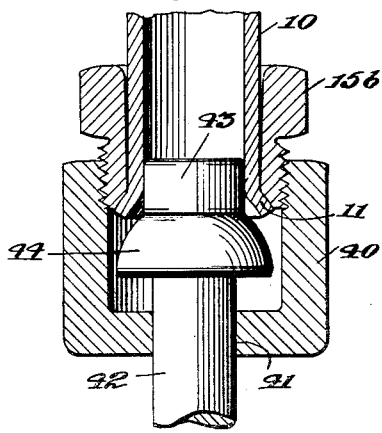
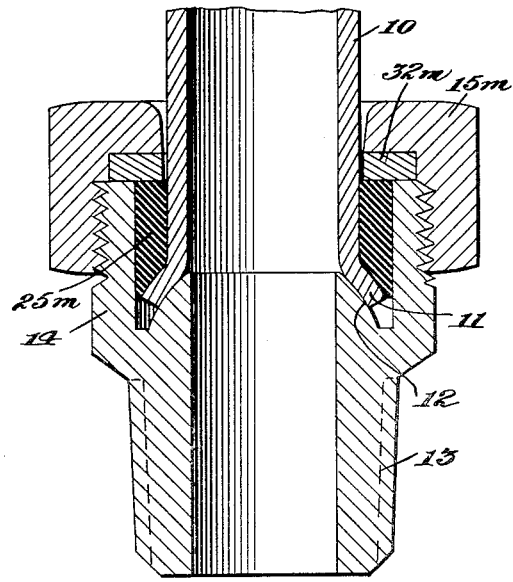
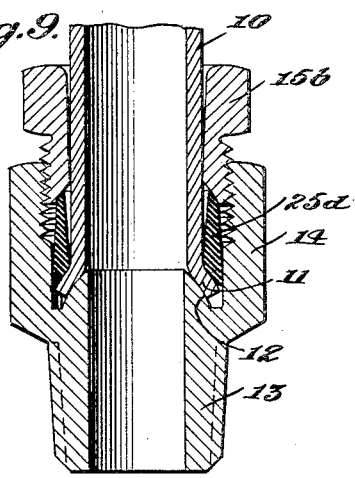
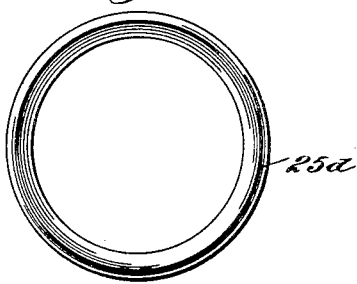
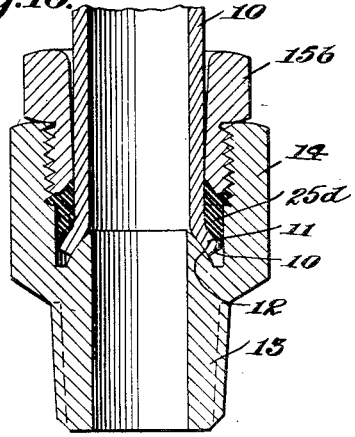
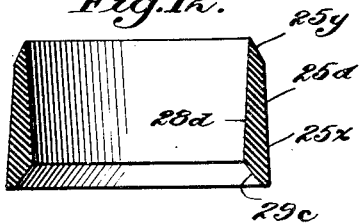
Inventor:
Arthur L. Parker,
by
Att'ys.

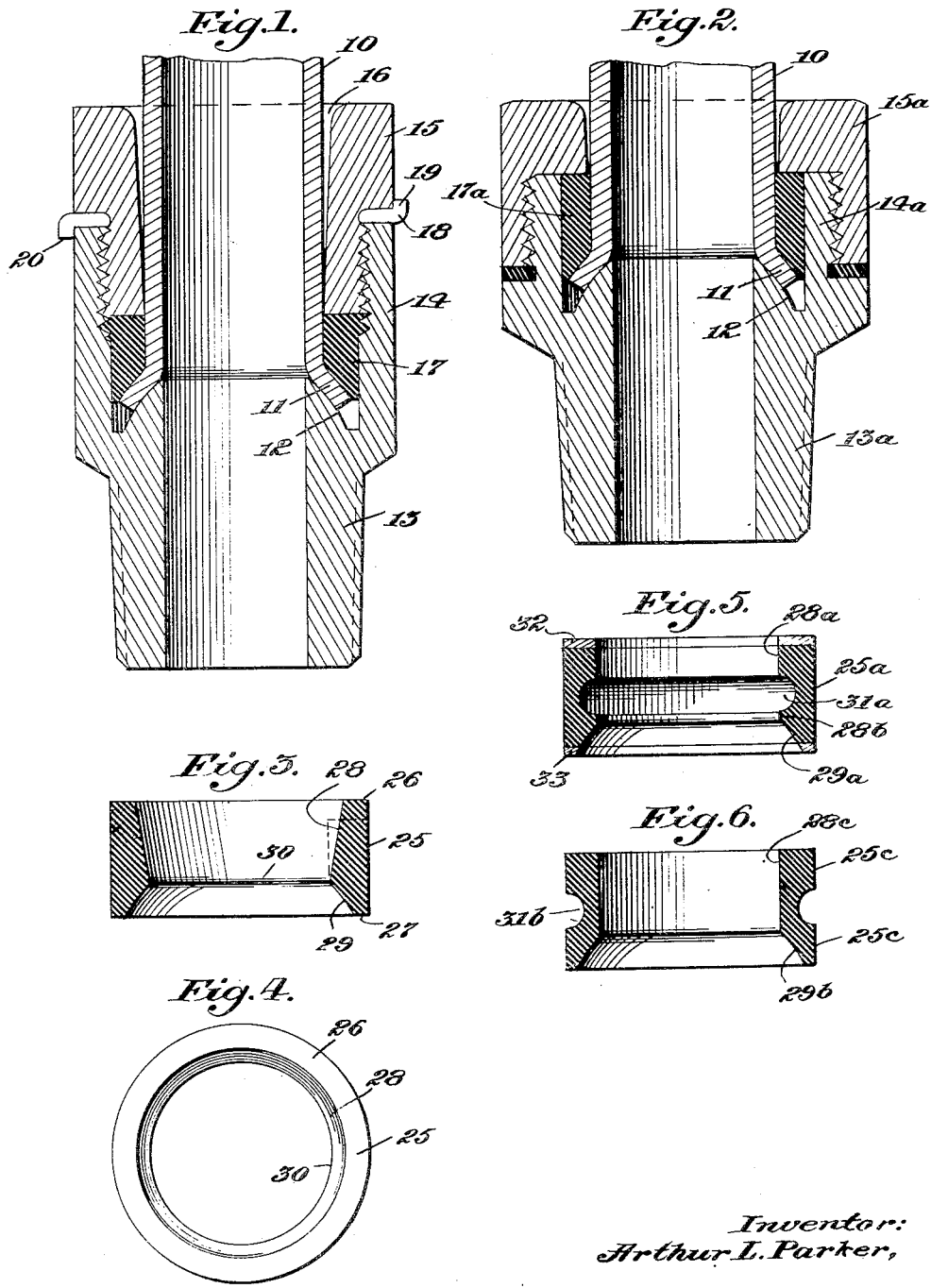

Patented Jan. 17, 1933

1,894,700

UNITED STATES PATENT OFFICE

ARTHUR LA RUE PARKER, OF CLEVELAND, OHIO

COUPLING AND WASHER ASSEMBLY

Application filed March 17, 1931. Serial No. 523,374.

This invention relates to improvements in coupling and washer assemblies for employment with tubes having flared ends.

One of the features of the present invention is a coupling in which two members are provided for engaging with one another in securing the flared end of a tube in sealed relationship to a passage through one of the coupling members; and in which a packing washer is employed, this packing washer being assured against compression beyond a predetermined degree by the limited inter-engagement of the two coupling members.

Another feature of the invention is the provision of a packing washer for such an assembly, this washer being of particular shape whereby the washer is prevented, under compression, from causing a crushing of the tube.

With these and other features in view, as will appear in the course of the following specification and claims, illustrative forms of the invention have been set forth in the accompanying drawings, in which Fig. 1 is an axial sectional view through a coupling and washer assembly according to the present invention.

Fig. 2 is a corresponding view of a modified form.

Fig. 3 is an axial sectional view through one type of packing washer.

Fig. 4 is an end view of the same.

Figs. 5 and 6 are axial sectional view of modified forms of the washer.

Fig. 7 is an axial sectional view of a further modified form of coupling and washer assembly.

Figs. 8, 9 and 10 represent stages in the assembly of a coupling of this type, with a further modified form of washer.

Figs. 11 and 12 are respectively end view and an axial section through the modified form of washer shown in Figs. 9 and 10.

Heretofore, in tightening coupling and washer assemblies upon the flared ends of pipes having thin walls, it has been found that the compression of the washer in an axial direction gives rise to an expansional movement in the radial direction, whereby the packing is assured. If an excessive compression is employed, this radial movement is directed largely toward the tube, since the coupling member is of much greater thickness, and hence in practice it has oftentimes resulted that the compression upon the washer causes a crushing of the tube, this crushing usually occurring closely adjacent the shoulder of the flare.

According to the present invention, the axial compression which may be exerted upon the washer is limited on the one hand, and the washer itself is shaped in such manner on the other hand that the compressional effort at the shoulder of the flare resulting from axial movement of the washer material is limited.

In the drawings, the tube 10 is shown as having a flare 11 at its lower end, the inner surface of this flare having substantially a spherical shape so that it conforms to the spherical surface 12 on an internal flange of a coupling member 13. The coupling member 13 has a sleeve extension 14 for threaded engagement with a second coupling member 15. The coupling member 15 has a conical passage 16 therethrough for the reception of the tube 10, while permitting the tube to adjust its position by the movement of the aforesaid spherical surfaces with regard to one another.

A packing washer 17 is located within the sleeve 14, and is held in compressed condition by the coupling member 15 in engagement with the outer surface of the flare 11 of the tube, whereby to establish a metal to metal joint between the inner surface of this flare and the mating portion of the inner flange of the coupling member 13. Under the axial pressure exerted upon the washer, while the coupling member 15 is being screwed into place the material of the washer is caused to move in an axial direction and thus to assist in completing the seal. However, the relative movement of the coupling members 13, 15, is limited in the assembly shown by their coming rigidly against a disk 18, which has extending spurs 19, 20 adapted to be bent upwardly and downwardly to form a nut lock to hold the coupling members 13, 15 against movement.

In the modified form of Fig. 2, the coupling member 13a has an extending sleeve 14a which fits inside of the other coupling member 15a. The packing washer 17a is thus enclosed within a chamber defined at its bottom substantially by the flare, at its inner side by the outer wall of the tube 10, at its outer side by the sleeve 14a, and at the top by the coupling member 15a. In this case, as the coupling member 15a is screwed down, it compresses the washer in an axial direction to establish a metal to metal seal as before, accompanied by a radial expansion of the washer to assist this seal. The movement of the coupling members 13a, 15a toward one another is limited when the two members are screwed to the end of their movement, so that an excessive compression of the washer is likewise not possible in this form of construction.

In Figs. 3 and 4, it will be noted that the washer is comprised of a body of elastic material such as a rubber mixture or the like, and has a substantially cylindrical external wall 25, and two flat end surfaces 26, 27. The inner surfaces comprise a pair of substantially conical surfaces 28, 29 which join at an edge 30. The lower substantially conical surface 29 is preferably slightly dished to correspond to the external surfaces of the flare 11. By this construction, the maximum thickness of the washer occurs in the radial plane of the edge 30, which is located in the assembled coupling closely adjacent the neck or bend where the flare joins the tube. As this washer is compressed in an axial direction, its upper surface 26 is moved downwardly, and there is a re-adjustment of the material in the washer until the washer assumes the shape indicated in dotted lines in Fig. 3. From this, it will be seen that although a considerable surface is developed both inside and out, on the washer, with respect to the tube and coupling walls, yet an excessive radial movement of the material adjacent the edge 30 is not required for the establishment of this seal, since the material yields regularly. Hence, the edge 30 is relieved from excessive compression and a tight seal is feasible.

In the form of execution shown in Fig. 5, the outer surface 25a of the washer is again substantially cylindrical, while the inner surface 28a is likewise substantially cylindrical but is provided with a groove or depresssion 31a which leaves a small portion, 28b, to provide an edge for engagement at the neck or junction between the flare and the tube. The lowest portion 29 of the internal surface is again substantially conical, but being slightly dished as before. The upper surface of the washer, according to Fig. 5, comprises a fiber or steel annulus 32 fixedly joined to the material of the washer as by vulcanizing. A similar annulus 33 is provided at the bottom. When the washer of Fig. 5 is employed, the annulus 33 prevents any downward squeezing of the washer material into the spaces between the flare and the sleeve 14 or 14a of Figs. 1 and 2, and also assists in holding the flare in its proper sealing relationship with the internal flange of the coupling member 13 or 13a. The upper annulus 32 prevents wearing or puckering of the surface of the washer by the lower ends of the coupling member 15 or 15a as the latter is turned down into position. In this form of the device, likewise, the delivery of an excessive pressure adjacent the neck of the tube and its flare is prevented.

In the form of Fig. 6, the lower portion 29b of the internal surface is formed substantially conical as before, while the upper portion 28c of this surface is substantially cylindrical. The external surface 25c is divided by an annular groove 31b so that here again the radial movement of the material at the neck of the tube and its flare does not cause a crushing of the tube.

In Fig. 7, the tube 10 has a flare 11 at its lower end for seating upon the surface 12 of the body portion 13, 14 of a coupling. The nut 15m is threadedly engaged with the wall 14 of the body; and is provided with an annular groove adjacent the tube aperture, for the reception of a stiff metal or fiber ring 32m. The washer 25m is received between the wall of the tube 10 and the wall 14 of the body as above. Upon turning the nut 15m the ring 32m presses downward upon the washer 25m and establishes through it the metal to metal contact between the flare 11 and the surface 12. The nut 15m however is able to turn upon the ring 32m so that there is no rubbing friction upon or tendency to chew the upper surface of the washer 25m. Finally, the movement of the nut 15m is limited by the engagement of the nut and washer down upon the upper edge of the wall 14 of the body, so that in this instance also the positive axial compression of the washer 25m is limited.

In Fig. 8, the employment of the nut 15b as the matrix for flaring the tube 10 is indicated. A member 40 is threadedly engaged with the nut 15b and has an aperture 41 in alignment with the axis of the tube, for the reception of the die or flaring tool 42 which has a portion 43 guided in the interior of the tube 10 and a flare-forming portion 44 which is of conical shape corresponding to the shape of the surface 12 of the body 13, 14 of the coupling. The member 40 is assembled with the nut 15b, and the head 44 is depressed by the introduction of the unflared tube end through the nut until it rests against the shoulder surrounding the aperture 41. A blow upon the end of the plunger 42 of the flaring tool then produces the flare 11. The member 40 and plunger 42 are then removed from the tube.

A washer of elastic material is then expanded by stretching, and moved over the flared end 11 so that it fits between the nut 15b and the flared portion 11 of the tube 10. The body 13, 14 of the coupling is then engaged with the nut 15b, and upon taking the parts together, the washer 25d is compressed axially and caused to elastically yield radially to establish and maintain the metal to metal contact between the flare 11 and the formed flange surface 12 and to pack between the tube 10 and the body wall 14 as set forth above.

In Fig. 9 it will be seen that the washer 25d is of a modified form, being shown in Figs. 11 and 12 as having a substantially conical lower surface 29c, preferably having a slight spherical shape so that it closely conforms to the outer surface of the flare 11. The inner wall 28d preferably has an upwardly divergent conical shape as shown in Fig. 12 while the outer wall 25x has an inward and upward curvature from the lower edge to a point adjacent the top of the washer, at which the outer surface 25y has an increased inward angle of convergence.

This washer is shown in Fig. 9 in its free condition, i. e., prior to compression thereon. When compression is exerted, the washer is compressed as indicated in Fig. 10 and then establishes a tight seal between the parts, as well as performing its function of maintaining the metal to metal contact between the surface 12 and the flare 11.

In Fig. 12, it will be noted that the several surfaces are substantially conical, the two end surfaces having their apices directed in the same direction, so that one end surface (the bottom one in the figure) is concave while the other is convex.

By the employment of a material of the nature of rubber for the packing washer, which in its "free" condition when initially located around the tube end adjacent the flare and seated within the cavity in the coupling member so that it has a greater dimension in the axial direction of the tube, in the "free" condition than it is intended to have when compressed axially, and thereafter compressing the washer in an axial direction for a limited distance so that it is modified in shape by such compression and caused to occupy a predetermined minimum volume at which there is a high pressure per unit area against the tube in the vicinity of the flare, the coupling may be assembled under such compression without danger of crushing the tube itself. Further, by the provision of a washer of the presently described form, the high pressure per unit area occurs at the point of maximum radial thickness of the washer, which is designedly located at the neck of the flare: while lesser pressures per unit area occur against the other portions of the tube. That is, the rubber washer is elastic as opposed to liquid in its character, and unlike a washer in which there is entire plasticity or liquidity and hence has equal pressures in all directions and at substantially all points, the rubber washer has a different pressure according to the shaping and dimensioning of the material since the thinner portions resist distortion by their inherent elasticity and hence give rise to lesser pressures against the tube wall than the thickest portions. From the above it will be apparent that a coupling for a tube end has been provided wherein a flexible clamping member is so shaped that when the tube is clamped against its seat a pressure is exerted on the tube throughout the entire region of the flexible clamping member, that is, against the flared end of the tube and also of the wall of the tube. Furthermore, there is a maximum pressure on the flared end of the tube and a minimum yielding pressure on the tube wall and thus vibrations of the tube in the coupling are yieldingly restrained. As a matter of fact, the tube may shift on its seat, thus preventing localized bending strains in the tube resulting in a fracturing of the metal tube.

It is obvious that the invention is not limited to the form of construction shown but that it may be modified in many ways within the scope of the appended claims.

I claim:

1. A flexible coupling for tubes comprising male and female members having a threaded connection and a recess within said members, one of said members having a projecting tapering portion extending into the recess and adapted to extend into the flared end of a tube and provide a seat therefor, the other coupling member having an opening to receive the tube, said opening having sufficient clearance to permit normal vibrations of the tube, a tube clamping member of flexible material located in said recess and surrounding the tube, said flexible clamping member in its free condition being shaped and dimensioned so that when the coupling members are connected, said coupling member with the opening therein will engage the flexible clamping member for forcing the clamping member against the flared end of the tube and the tube against said seat, and pressure will be exerted on the tube throughout the entire region of the flexible clamping member with a maximum pressure on the flared end of the tube and a minimum yielding pressure on the tube wall whereby vibrations of the tube in the coupling member are yieldingly restrained.

2. A flexible coupling for tubes comprising male and female members having a threaded connection and a recess within said members, one of said members having a projecting tapering portion extending into the recess and adapted to extend into the flared end of a tube and provide a seat therefor, the other coupling member having an opening to receive the tube, said opening having sufficient clearance to permit normal vibrations of the tube, a tube clamping member of flexible material located in said recess and surrounding the tube, said flexible clamping member in its free condition being shaped and dimensioned so that when the coupling members are connected, said coupling member with the opening therein will engage the flexible clamping member for forcing the clamping member against the flared end of the tube and the tube against said seat, and pressure will be exerted on the tube throughout the entire region of the flexible clamping member with a maximum pressure on the flared end of the tube and a minimum yielding pressure on the tube wall which decreases outwardly away from the flared end of the tube whereby vibrations of the tube in the coupling member are yieldingly restrained.

3. A flexible coupling for tubes comprising male and female members having a threaded connection and a recess within said members, one of said members having a projecting tapering portion extending into the recess and adapted to extend into the flared end of a tube and provide a seat therefor, the other coupling member having an opening to receive the tube, said opening having sufficient clearance to permit normal vibrations of the tube, a tube clamping member of flexible material located in said recess and surrounding the tube, said flexible clamping member in its free condition being shaped and dimensioned so that when the coupling members are connected, said coupling member with the opening therein will engage the flexible clamping member for forcing the clamping member against the flared end of the tube and the tube against said seat, and pressure will be exerted on the tube throughout the entire region of the flexible clamping member with a maximum pressure on the flared end of the tube and a minimum yielding pressure on the tube wall whereby vibrations of the tube in the coupling member are yieldingly restrained, said seat on the coupling member having a spherical face conforming to and contacting with the spherical face on the flared end of the tube.

In testimony whereof, I affix my signature.

ARTHUR LA RUE PARKER.